United States Patent Office 3,262,951
Patented July 26, 1966

3,262,951
HIGH MOLECULAR WEIGHT FATTY ACID AMIDO AMINE SURFACTANT AND PREPARATION THEREOF
Jacob Katz, Providence, R.I.
(48 Hunt St., Central Falls, R.I.)
No Drawing. Filed Nov. 25, 1960, Ser. No. 71,439
2 Claims. (Cl. 260—404.5)

The present application relates to novel surfactants, and it particularly relates to a high molecular weight fatty surfactant having high effectiveness in a wide variety of acidities and alkalinities.

It is among the objects of the present invention to provide a high effective detergent which will maintain a high fine bubble foam over long periods of time in textile processing, operates without deterioration or loss of effective foam properties and without decreasing the volume of the foam regardless of the change in pH whether it be strongly acid or become strongly alkaline.

Another object is to provide novel procedure for making highly effective detergent materials of high foaming properties which will produce a very fine bubble stable foam in very small concentration and relatively great dilution regardless of the salts that may be present or the pH of the bath in which the foam is being produced.

Another object is to provide a novel high molecular weight fatty nitrogenous compound which in extremely small dilutions will have unusually high corrosive inhibiting properties and which may be widely utilized in metal processing such as electroplating, radiator liquids, and coolants for metal processes.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, a high molecular weight fatty acid having eight to twenty-two carbon atoms and desirably eleven to eighteen carbon atoms is combined with an alkanolamine or a polyalkylene polyamine containing two to six amino groups, two to six diethylene, triethylene or tetraethylene groups, one or two terminal hydroxyl groups, and if desired, one to three intermediate oxygen linkages.

This combination to form an amide is desirably carried on in a three-neck flask equipped with a stirrer, thermometer and Stark-Dean Moisture collecting trap at about 300° F. to 400° F. for two hours.

Desirably, a catalyst is used such as ½% of sodium methylate.

Among the amines that may be employed, are the following:

Aminoethylethanolamine
Diethylene triamine
Triethylene tetramine
Tetraethylene pentamine
Monoethanolamine
Diethanolamine
Triethanolamine
Methyl glucamine
2-amino-2-methyl-1-propanol
2-amino-2-methyl-1,3-propanediol
2-amino-2-ethyl-1,3-propanediol
Tris (hydroxymethyl) aminomethane
2-amino-1-butanol
N'-isopropyl-2-methyl-1,2-propanediamine methyl-monoethanolamine In general, the amines employed should be of the following formulation:

$$X(CH_2)_nY(CH_2)_nZ$$

where X, Y and Z are amine, oxygen or hydroxyl groups and $n$ is an integer ranging from two to four. Desirably X and Z are —$NH_2$— groups or are —$NH_2$— and one —OH group while Y is desirably —O— or —NH— or —NR—.

It is, of course, understood that the pattern of the chain between the terminal groups X and Z may be repeated so as to give two, three or four intermediate Y groups or rings in the course of the chain while there are an additional number of intermediate —$(CH_2)_n$— groups.

As typical of the various intermediate compounds which may be formed, the following equations are given:

I $RCOOH + H_2NCH_2CH_2NHCH_2CH_2OH \rightarrow$
$RCONHCH_2CH_2NHCH_2CH_2OH$

II $RCOOH + NH_2CH_2NH\ CH_2CH_2NH_2 \rightarrow$
$RCONHCH_2CH_2NHCH_2CH_2NH_2$

wherein RCOOH is a high molecular weight fatty acid.

In the above equations, the fatty acids may be oleic acid, tall oil fatty acid, stearic acid, coconut fatty acid, abietic acid, sebacic acid or dimerized or trimerized fatty acids.

In the above equations, in Equation I the amine used is aminoethylethanolamine, and in Equation II, the amine used is diethylene triamine.

In Equation III, the amine is diethanol amine.

The product then produced according to Equations I, II and III is combined with an acrylic compound having a double bond in the chain with a terminal —CN— or —COOH— group and with three to six carbon atoms.

There may also be included methyl, ethyl or propyl terminal groups or as intermediate groups in the chain.

The preferred acrylic compounds are acrylonitrile, methyl acrylonitrile, methyl acrylate, ethyl acrylate or beta propiolactone.

These compounds may be classified as low molecular weight acrylic compounds having 3 to 6 carbon atoms.

The acrylic compound is added in dropwise fashion in a three-neck flask also having an agitator, a thermometer, and a condenser at a temperature of about 100° to 150° F.

Afterwards, the reaction mixture is heated for about one and one-half to three hours at 200° to 220° F. under a vacuum of 15 to 25 inches.

Finally, an equimolar proportion of caustic soda in 25% solution is added to the reaction mixture, and the reaction mixture is heated for two hours.

The final products produced will have the general formula as follows:

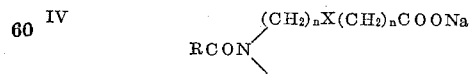

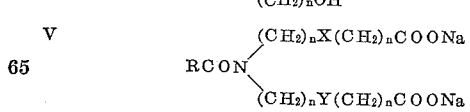

where R is an alkyl group containing 8 to 22 and preferably 11 to 18 carbon atoms, X and Y are —NH— or —O— or —NR—, R is methyl, ethyl or propyl and $n$ is an integer ranging from 2 to 4.

These compounds are most satisfactory anticorrosive agents and detergents and emulsifying agents even when used in an amount ranging from 1/10 to 1/4%.

They are useful in very small quantities, widely varying pH from 3 to 10, for emulsifying and in textile scouring dyeing and lubrication.

In the above preferred compounds, it is desirable that the amide groups be at the extreme end of the compound away from the salt or sodium carboxylate group and that the intermediate of the chain should be a secondary or preferably a tertiary amino group, and less desirably, an oxygen group with polyethylene groups linking the two intermediate, secondary or tertiary amino groups to the amide at one end and to the carboxylate at the other end.

Although the polyethylene group is preferred having two, three or four —$CH_2$— groups, nevertheless, it can have from one to six —$CH_2$— groups.

These compounds are aliphatic amines selected from the group consisting of alkanolamines having 1 to 4 hydroxy groups, 2 to 10 carbon atoms, and 1 to 4 amino groups.

Generally, the aliphatic polyamine or the hydroxyl alkylamine containing from four to twelve carbon atoms, one to four primary or secondary amino groups and one to three hydroxyl groups is combined in an excess of about one and one-half mols to one mol of a fatty acid at 325° to 375° F.

Although the fatty acid itself may be utilized, it is also possible to use the methyl or ethyl esters of fatty acids or the corresponding fatty acid chlorides.

After this reaction has proceeded for about one and one-half to three hours in the presence of about 1/4 to 3/4% of sodium methylate or sodium ethylate, the acrylonitrile or the methylacrylate is added to the reaction mixture, drop by drop at a temperature of about 150° to 200° F. with stirring and refluxing for a period of two to three hours.

Finally, an equimolar proportion of caustic soda and dilute aqueous solution of about 20 to 35% is added, followed by treatment for one-half to two hours.

The resulting compound is an effective corrosion inhibitor and may be used in very small proportions of 1/10 to 1/4% in coolant liquids or in radiator liquids.

It is highly effective at a pH of 3 to 10 in caustic or acid baths.

It is particularly useful in pickling baths.

It also may be utilized in detergents, and it forms an excellent high stability foam in very small concentrations less than 1/2%.

The following are several specific examples of the various procedures which may be utilized. The preferred alkanol amines are aminoethyl-ethanolamine, mono-, di- and tri-ethanolamines, 2-amino-2-methyl-1-propanol, 2-amino-2-amino-2-methyl-1, 3-propanediol, 2-amino - 2 - ethyl-1, 3-propanediol, tris (hydroxymethyl) amino methane, 2-amino-1-butanol and methyl-mono-ethanolamine.

The preferred polyamines are diethylene, tri-amine, tri-ethylene tetraamine, tetraethylene pentaamine and N'-isopropyl-2-methyl-1,2-propane diamino.

The preferred acrylic compounds are acrylonitrile, methylacrylonitrile, methyl acrylate and ethyl acrylate.

*Example VI*

One mol of lauric acid and one mole of aminoethyl-ethanolamine according to equation I above were charged into a three-neck flask equipped with a thermometer, agitator and Stark-Dean water trap.

The mixture was heated to 350° F. and held at this temperature until one mol of water was collected in the water trap.

The contents of the flask was cooled to 150° F. and one mol of methylacrylate was added. The temperature was then raised to 200° F. and kept there until all the methyl-acrylate had reacted to form the methylpropionate derivative of the fatty amido-amine.

The resulting product is a soft yellow wax which was soluble in petroleum solvents, alcohols, ketones, ethers and glycols showing excellent oil soluble surfactant properties.

The sodium salt was formed by the addition of one mol sodium hydroxide (dissolved in 180 milliliters of water) to the contents of the flask with stirring. At the end of two hours, saponification was complete and the product was diluted with water to 50% active matter.

The resulting N-lauramidoethyl-N-hydroxyethyl-N'-sodium propionate solution is a clear yellow liquid, soluble in acid and alkaline solutions in all proportions giving excellent detergency and high foam.

The lauramidoethyl-ethanolamine can also be reacted with two mols of methylacrylate per mol of hydroxy amine to form N-lauramidoethyl-N-ethoxy sodium propionate N-sodium propionate which is very soluble in high concentrations of salts and is stable in acid and alkaline solutions.

*Example VII*

Into a three neck flask equipped with an agitator, thermometer and Stark-Dean water trap was placed one mol oleic acid and one mol diethylenetriamine which were reacted according to Equation II.

The mixture was heated to 350° F. and held at this temperature until 18 milliliters of water was collected in the Stark-Dean trap at which time the contents was cooled to 125° F., and one mole of acrylonitrile added thereto over a period of one hour.

The temperature was then gradually raised to 225° F. and held until no further reflux showed in the condenser.

The propionitrile derivative was a clear yellow liquid soluble in petroleum solvents, alcohols, ethers, ketones, and dispersible in water at 1/2% concentration.

The acrylonitrile adduct of the oleyl amide of diethylenetriamine was saponified with caustic soda at 212° F. and adjusted to 50% active matter with hot water. The flask was then purged of the last traces of ammonia with nitrogen gas.

The resulting product was soluble in water with good foam, showing excellent detergency on cotton, wool and synthetic fabrics. It is stable in highly acid and alkaline solutions and can be used as an emulsifier for insecticides, oils, fats and waxes.

It is to be noted that the oleylamidoethylethylene diamine has three reactive hydrogens with which the acrylonitrile may react to form an adduct, and depending on the properties of the surfactant desired, the mols of acrylonitrile used may vary from 1 mol to 3 mols.

(VIII)  $RCONH \cdot C_2H_4 \cdot NH \cdot C_2H_4 \cdot NH$
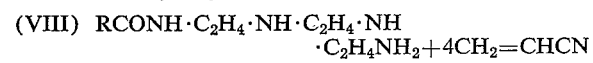
$\cdot C_2H_4NH_2 + 4CH_2=CHCN$ Oleyl amide of triethylene tetramine+4 moles acrylonitrile.

*Example IX*

One mol of stearic acid and one mol of diethanolamine according to Equation III above was heated with stirring to 350° F. and held at this temperature until the acid value of the product had dropped to 3.0 at which point the contents was cooled to 150° F. and two mols of methylacrylate was slowly added through a dropping funnel over a period of one hour.

The temperature of reaction was then raised to 200° F. and held there until the methacrylate had completely reacted. The methyl ester was converted to the sodium salt by the addition of 400 grams of 20% sodium hydroxide solution and heating at 200° F. until saponification was completed.

The contents of the flask was adjusted to 25% active matter with hot water to form a white paste.

The N,N-diethoxy sodium propionate-stearamide has good detergency and showed excellent finishing properties on all kinds of fabrics imparting a soft hand with zero yellowing at 350° F. (such as used in resin curing).

The above compound can easily be converted to the acid with HCl and neutralized with either low molecular weight or high molecular weight amines to form oil soluble salts which show excellent filming properties and outstanding corrosion inhibiting characteristics.

As many changes could be made in the above high molecular weight fatty acid amido amine surfactants, and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. As a surfactant, N-lauramidoethyl-N-hydroxyethyl-N'-sodium propionate.
2. A process of making N-lauramidoethyl-N-hydroxyethyl-N'-sodium propionate which comprises combining one mol of lauric acid and one mol of aminoethylethanolamine at 350° F., until one mol of water is released, cooling the reaction mixture to 150° F. and then adding one mol of methacrylate drop by drop at 150° F. and permitting the temperature to rise to 200° F. and then saponifying with caustic soda.

References Cited by the Examiner

UNITED STATES PATENTS

| | | | |
|---|---|---|---|
| 1,973,860 | 9/1934 | Ulrich et al. | 260—404 |
| 2,785,092 | 3/1957 | Hiestand et al. | 260—404.5 |
| 3,001,996 | 9/1961 | Mannheimer | 260—404.5 X |
| 3,127,365 | 3/1964 | Floyd | 260—404.5 X |

CHARLES B. PARKER, *Primary Examiner.*

A. H. WINKELSTEIN, *Examiner.*

R. N. JONES, J. P. BRUST, R. V. HINES,
*Assistant Examiners.*